(12) United States Patent
Davis

(10) Patent No.: US 11,385,087 B2
(45) Date of Patent: Jul. 12, 2022

(54) VALVE ASSEMBLY FOR A DOSE FILLING MACHINE HAVING IMPROVED SEAL ASSEMBLIES

(71) Applicant: Winpak Lane, Inc., San Bernardino, CA (US)

(72) Inventor: Steven Davis, San Bernardino, CA (US)

(73) Assignee: Winpak Lane, Inc., Rialto, CA (US)

( * ) Notice: Subject to any disclaimer, the term of this patent is extended or adjusted under 35 U.S.C. 154(b) by 52 days.

(21) Appl. No.: 17/099,463

(22) Filed: Nov. 16, 2020

(65) Prior Publication Data

US 2022/0155124 A1 May 19, 2022

(51) Int. Cl.

| | |
|---|---|
| *F16K 11/085* | (2006.01) |
| *G01F 11/22* | (2006.01) |
| *F16K 15/04* | (2006.01) |
| *F16K 41/02* | (2006.01) |
| *F16K 27/06* | (2006.01) |

(52) U.S. Cl.
CPC .......... *G01F 11/22* (2013.01); *F16K 11/0856* (2013.01); *F16K 15/04* (2013.01); *F16K 27/065* (2013.01); *F16K 41/026* (2013.01)

(58) Field of Classification Search
CPC .. F16K 11/0856; F16K 27/065; F16K 41/026; Y10T 137/5762; Y10T 137/86646; Y10T 137/86654; Y10T 137/86863; Y10T 137/86871
See application file for complete search history.

(56) References Cited

U.S. PATENT DOCUMENTS

| | | | | |
|---|---|---|---|---|
| 4,658,859 | A * | 4/1987 | Backe | F16K 11/0856 |
| | | | | 137/625.22 |
| 7,661,437 | B2 * | 2/2010 | Schulz | F16K 41/103 |
| | | | | 251/335.2 |
| 8,662,099 | B2 * | 3/2014 | Arnold | F16K 37/0058 |
| | | | | 251/305 |
| 2018/0087501 | A1 * | 3/2018 | Hopkins | F04B 19/22 |
| 2019/0264816 | A1 * | 8/2019 | Bartolotta | F02D 9/106 |

* cited by examiner

*Primary Examiner* — Kevin F Murphy
(74) *Attorney, Agent, or Firm* — The Watson IP Group, PLC; Jovan N. Jovanovic

(57) ABSTRACT

A valve assembly for a dose filling machine having a valve body, a rotor and a first end seal assembly. The valve body has a main supply bore, a rotor bore, an upper rotor piston bore, and a side rotor dispensing bore. The rotor is rotatably positioned in the rotor bore. The first end seal assembly comprising a first end rotor seal engaging the valve bore and the rotor. A first end inner plate overlies the first side of the valve body and the first end rotor seal. The first end outer plate includes a bearing positioned within an opening thereof. A transverse slot extends from the opening to an outer edge so that a leak beyond the first end rotor seal proceeds through the transverse slot away from the bearing.

17 Claims, 15 Drawing Sheets

VALVE ASSEMBLY FOR A DOSE FILLING MACHINE HAVING IMPROVED SEAL ASSEMBLIES

CROSS-REFERENCE TO RELATED APPLICATION

NA

BACKGROUND OF THE DISCLOSURE

1. Field of the Disclosure

The disclosure relates in general to dose filling machines, and more particularly, to a sanitary seal assembly for a dose filling machine.

2. Background Art

The use of filling equipment that can supply a repeatable, well controlled dose to fill a predetermined volume with a flowable material is known in the art. Typically, such equipment relies on volumetric controls to eject a predetermined quantity of flowable material at particular intervals to fill containers with the flowable material. Such equipment has to maintain sanitary conditions, as, in many instances, the flowable material that is filled comprises a foodstuff.

Such equipment is configured to run hours on end, with a substantially continuous supply of flowable material. In many instances, the startup procedure is quite complicated, and, very time consuming. As a result, in the event of a failure in the equipment that requires a repair, the startup process may take substantially longer than the repair. Thus, prolonging the time between repairs, or the time that the machine is down, can greatly impact the productivity of the equipment. In some instances, certain leakage of flowable material does not require immediate repair, if the leakage of flowable material can be maintained away from certain structures and certain components. If such leakage can be successfully contained or directed away from components, in a proper manner, the uptime of the equipment can be increased.

SUMMARY OF THE DISCLOSURE

The disclosure is directed a valve assembly for a dose filling machine. The dose filling machine comprises a valve body, a rotor and a first end seal assembly. The valve body has a first side surface and a second side surface. The valve body defines a main supply bore, a rotor bore, an upper rotor piston bore and a side rotor dispensing bore. The main supply bore has an inlet bore and an outlet bore. The rotor bore extends between the first side surface and the second side surface. The rotor bore is in fluid communication with the outlet bore of the main supply bore. The upper rotor piston bore is in fluid communication with the rotor bore. The upper rotor piston bore has an inlet and an outlet. The side rotor dispensing bore is in fluid communication with the rotor bore and has an inlet and an outlet. The rotor is positioned within the rotor bore and rotatable therewithin relative to the valve body. The rotor has a first end extending beyond the first side surface of the valve body and a second end opposite the first end.

The first end seal assembly is positionable over the first side surface of the valve body. The first end seal assembly further comprises a first end rotor seal, a first end inner plate, a first end outer plate. The first end rotor seal sealingly engaging the valve bore and the rotor proximate the first side surface of the valve body. The first end inner plate having an inner surface and an outer surface. The first end inner plate overlies the first side surface of the valve body. The first end inner plate further having an opening through which the first end of the rotor extends. The first end outer plate having an inner surface facing the outer surface of the first end inner plate. The first end outer plate having an opening having a first end bearing positioned therein, with the first end of the rotor extending through the opening and the first end bearing, and, the inner surface of the first end outer plate having a transverse slot extending from the opening toward an edge of the first end outer plate closer to the bottom surface of the valve body.

In some configurations, the first end bearing is spaced apart from the inner surface of the first end outer plate.

In some configurations, the opening in the first end outer plate defines a floor upon which the bearing is seated.

In some configurations, the bearing corresponds to a lower surface of the transverse slot.

In some configurations, the transverse slot extends from an upper end of the first outer plate to a lower end of the first outer plate.

In some configurations, the valve body has a top surface and a bottom surface, and a front surface, to define a rectangular cubic configuration. The transverse slot extends substantially perpendicular to the top surface of the valve body.

In some configurations, the transverse slot has a width, with the width being smaller than the opening in the first end outer plate.

In some configurations the valve assembly further comprises a first end gasket positioned between the first end inner plate and the first side surface.

In some configurations, a portion of the first end gasket overlies a portion of the first end rotor seal.

In some configurations, the inner surface of the first end inner plate includes an inwardly directed rim at an upper end thereof and at a lower end thereof. The inwardly directed rims extend on either side of the first end gasket.

In some configurations, the rotor has a step down surface at the first end thereof. The diameter of the step down surface is smaller than a diameter of the rotor, and the step down surface extends beyond the first side surface of the valve body.

In some configurations, the bearing comprises one of a ball bearing and a roller bearing.

In some configurations, the bearing comprises a sealed ball bearing.

In some configurations, the valve assembly further comprises a second end seal assembly. The second end seal assembly comprises a second end plate with a second end rotor seal and a second end bushing. The second end rotor seal sealingly engaging the rotor and the second side surface of the valve body. The second end plate having a second end bushing positioned in an opening thereof, with the second end of the rotor extending therethrough.

In some configurations, the rotor further includes at least one connecting slot, the connecting slot being positionable in a first orientation placing the main supply bore in fluid communication with the upper rotor piston bore. The second orientation placing the upper rotor piston bore in fluid communication with the side rotor dispensing bore.

In some configurations, the first orientation and the second orientation are 90° apart in rotation of the rotor.

In some configurations, the outlet bore, the rotor bore, the upper rotor piston bore and the side rotor dispensing bore collectively define a port, with the valve assembly having a plurality of ports. The rotor includes a connecting slot corresponding to each port.

BRIEF DESCRIPTION OF THE DRAWINGS

The disclosure will now be described with reference to the drawings wherein.

DETAILED DESCRIPTION OF THE DISCLOSURE

Figure 1:
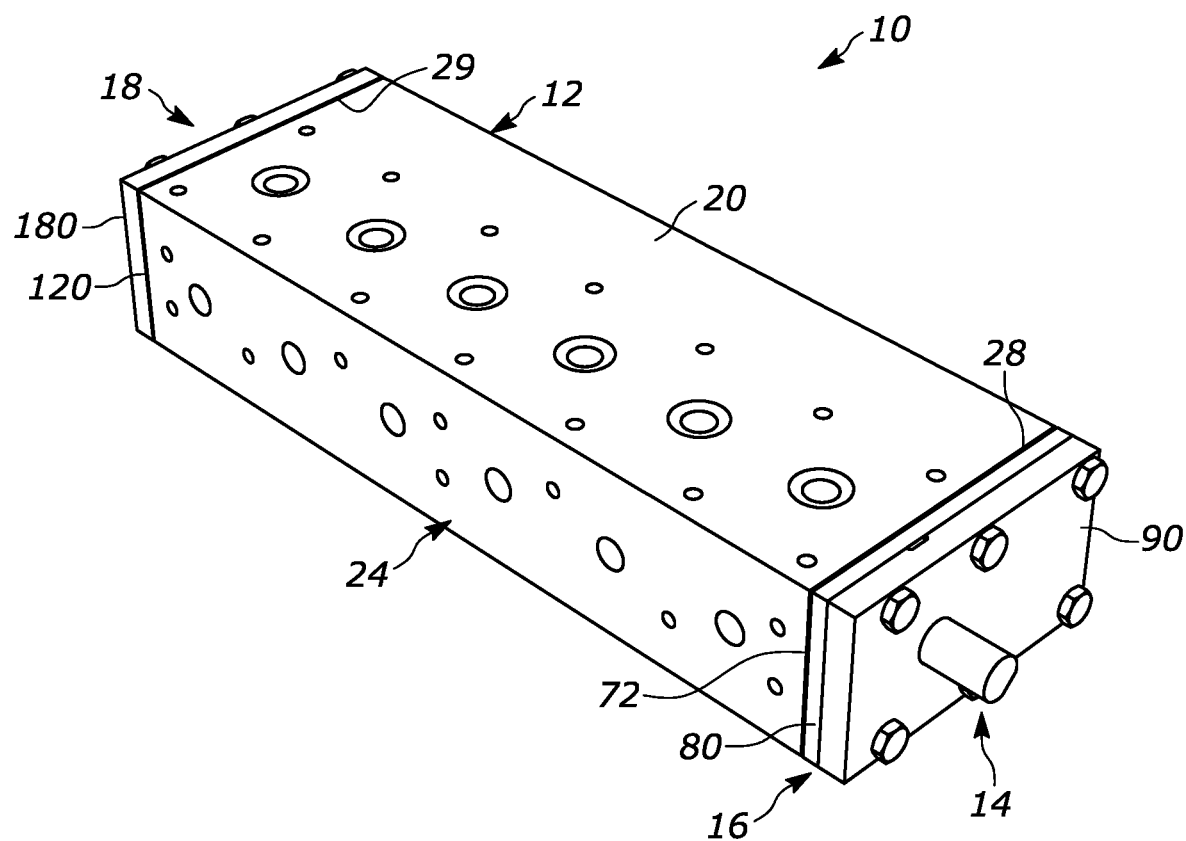
FIG. 1 of the drawings is a perspective view of the valve assembly for a dose filling machine of the present disclosure.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
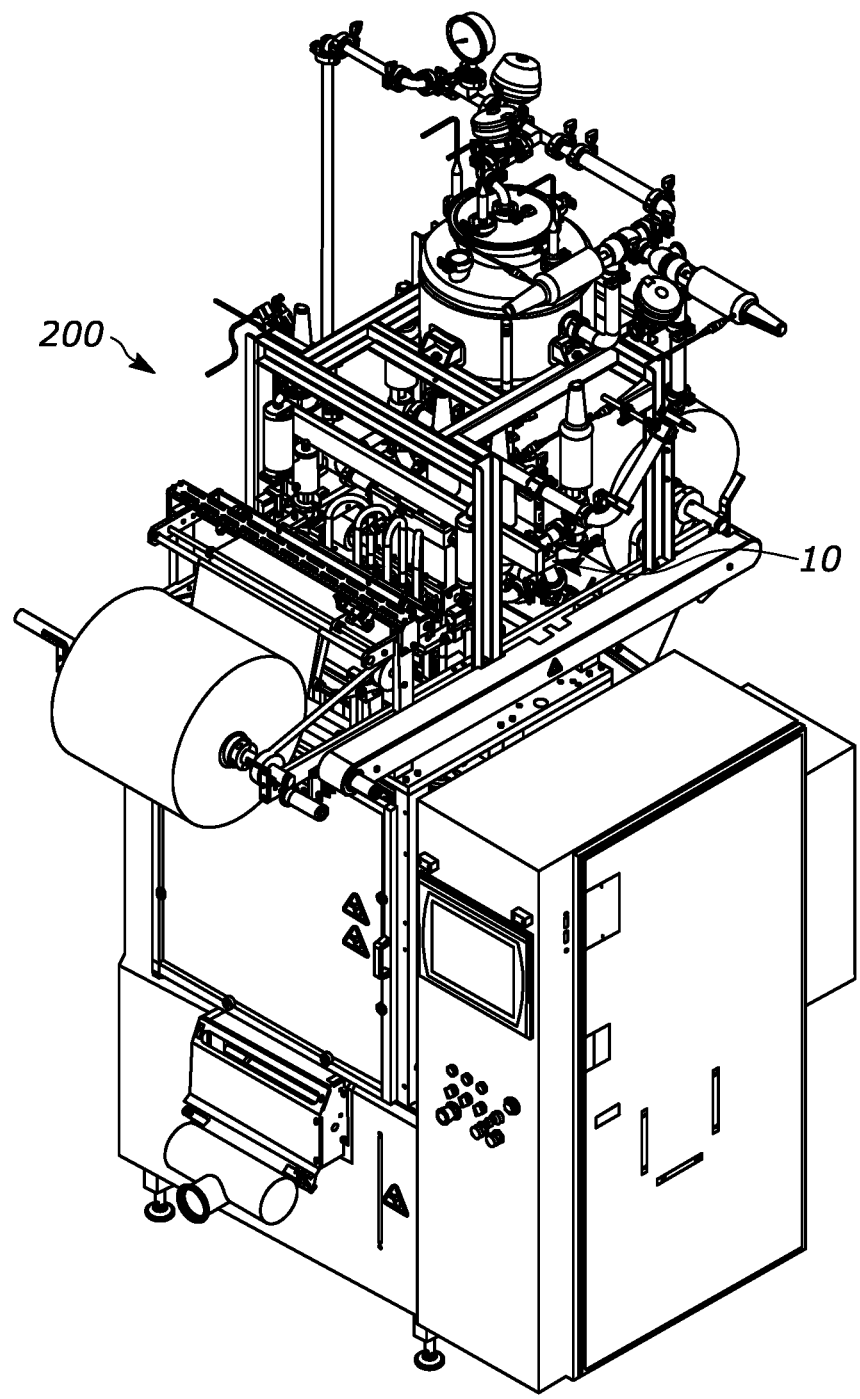
FIG. 2 of the drawings is a front perspective view of a dose filling machine having a valve assembly of the present disclosure.
Figure 3:
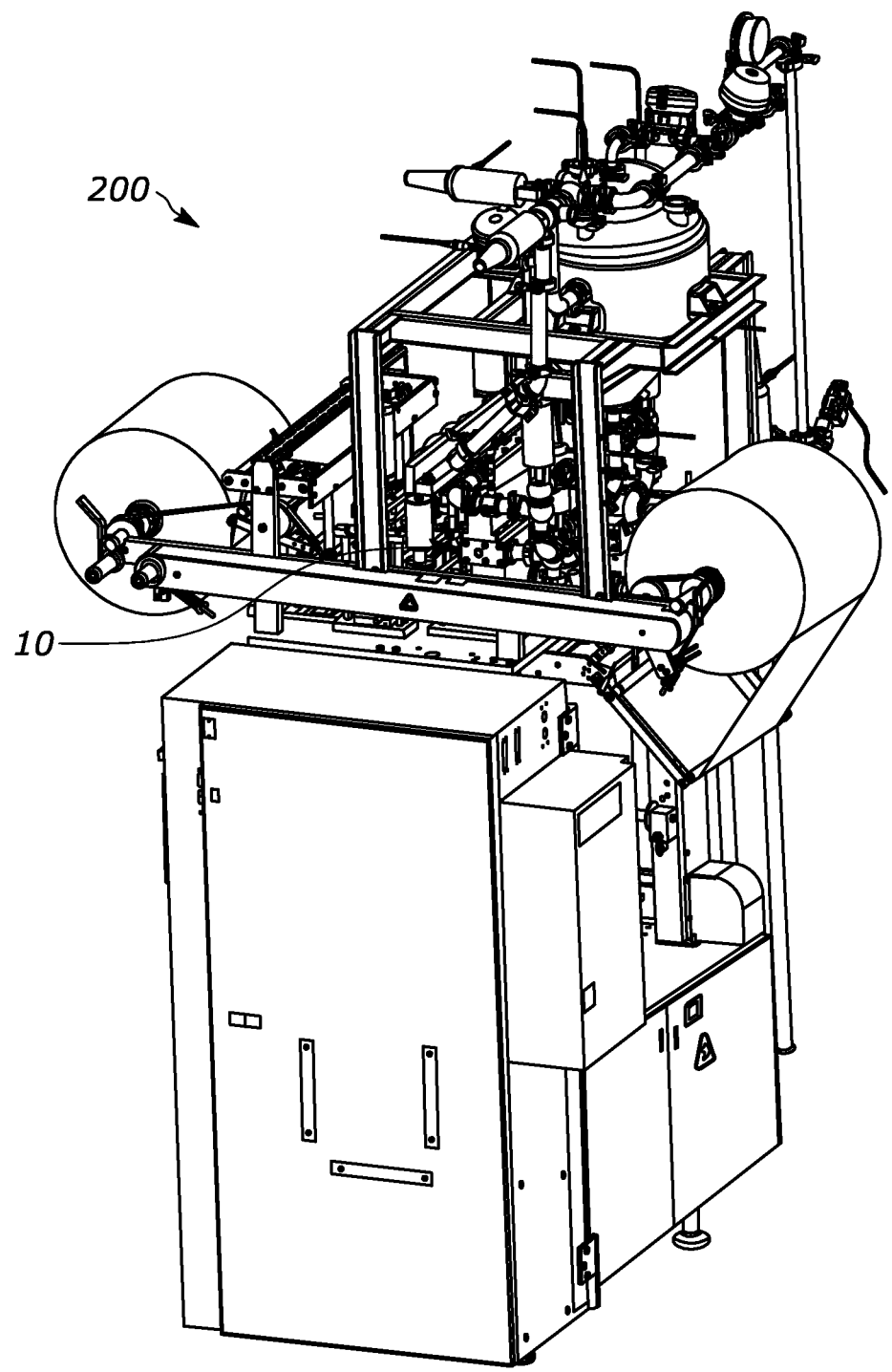
FIG. 3 of the drawings is a back perspective view of a dose filling machine having a valve assembly of the present disclosure.
Figure 4:
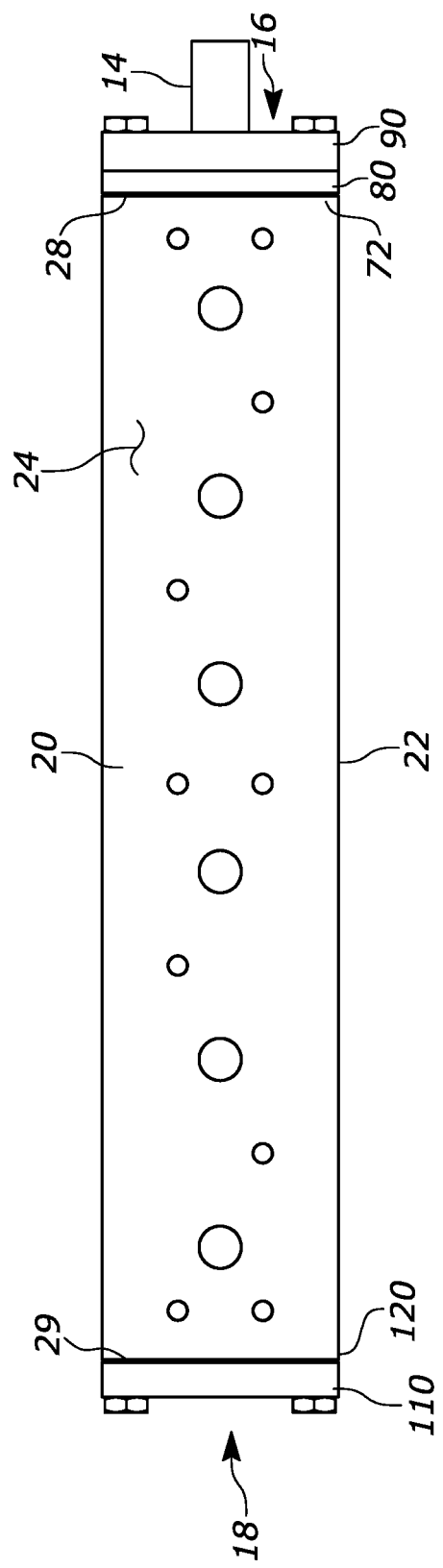
FIG. 4 of the drawings is a front elevational view of the valve assembly of the present disclosure.
Figure 5:
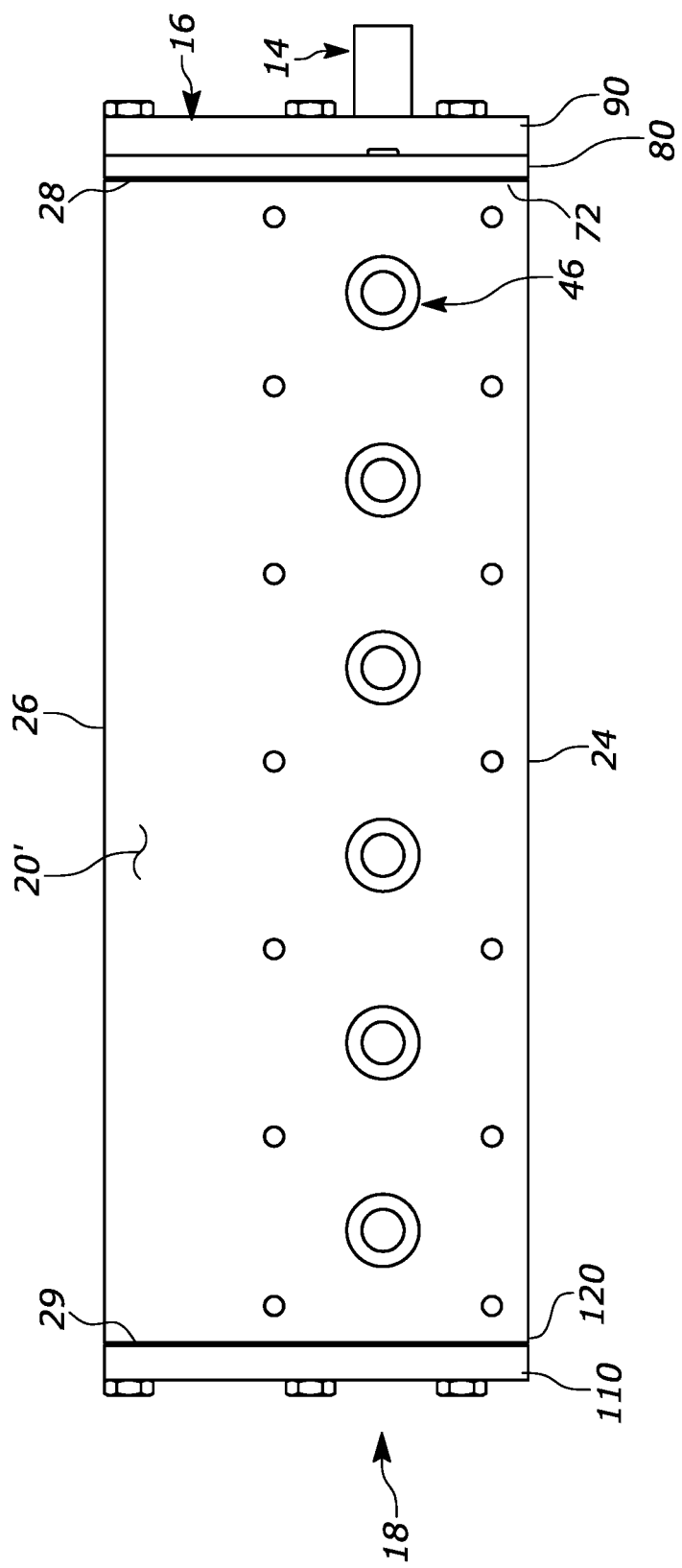
FIG. 5 of the drawings is a top plan view of the valve assembly of the present disclosure.
Figure 6:
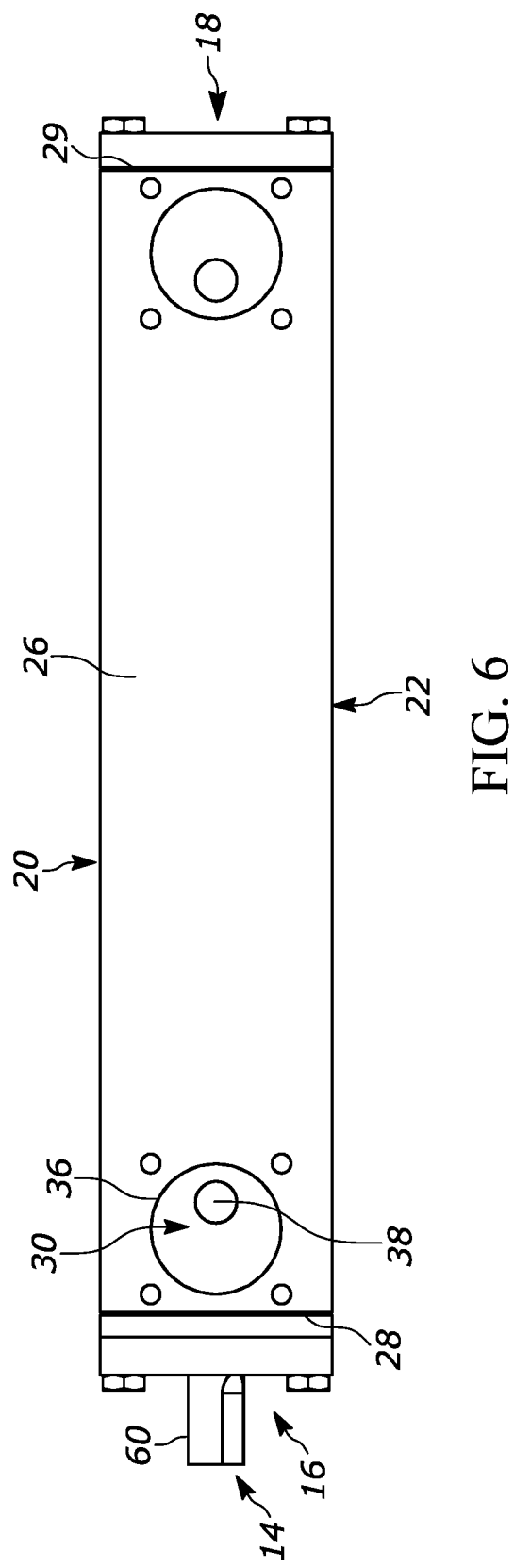
FIG. 6 of the drawings is a back elevational view of the valve assembly of the present disclosure.
Figure 7:
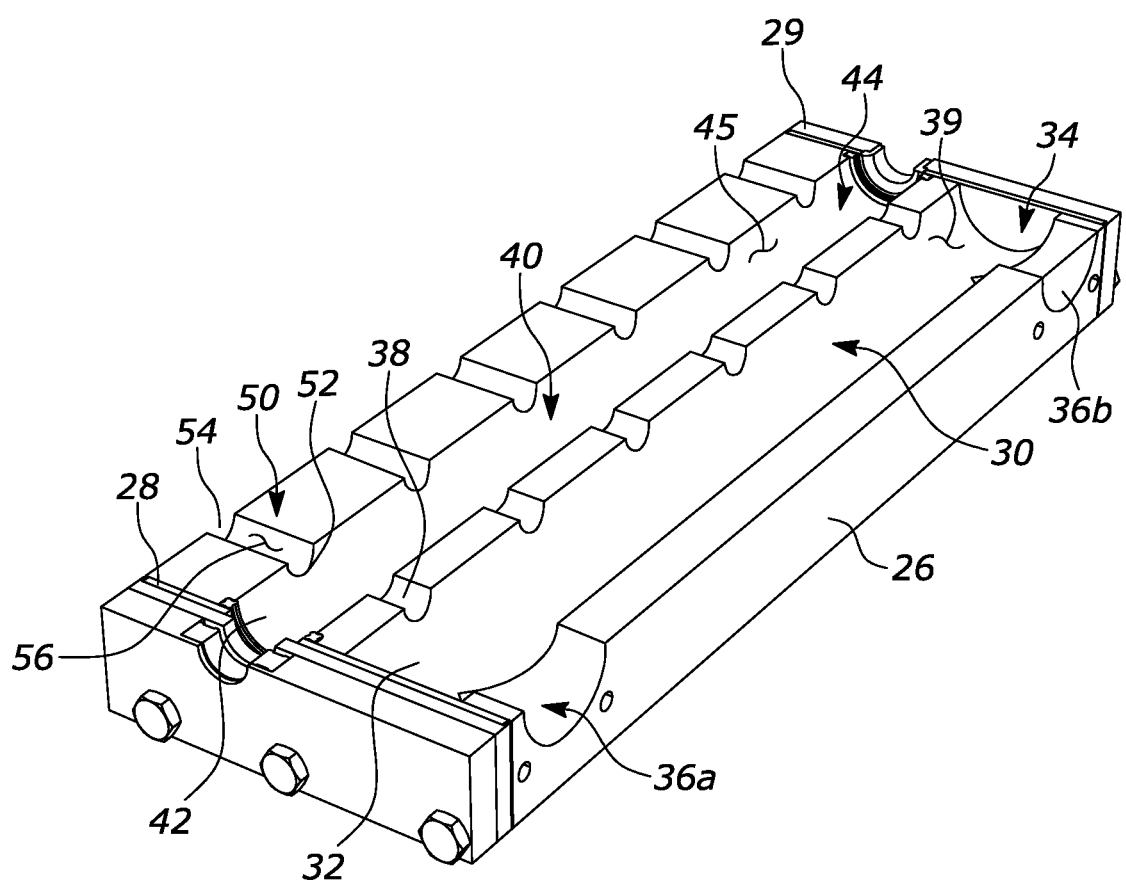
FIG. 7 of the drawings is a cross-sectional perspective view of the valve assembly of the present disclosure, with the rotor removed.
Figure 8:
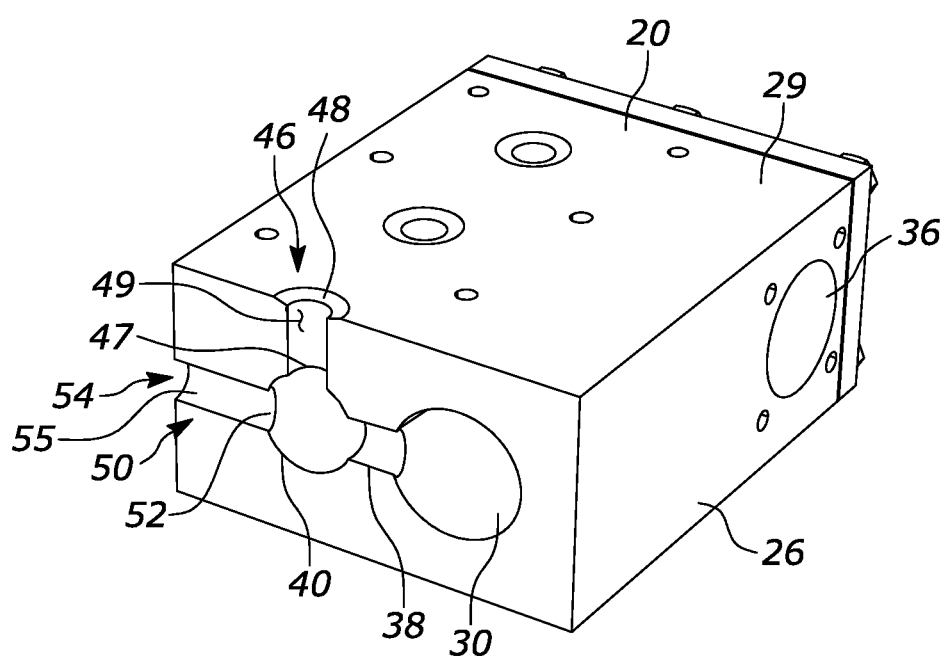
FIG. 8 of the drawings is a cross-sectional perspective view of the valve assembly of the present disclosure, with the rotor removed, showing, a port of the valve body.

Referring now to the drawings and in particular to FIG. 1, valve assembly for a dose filling machine having improved seal assemblies is shown at 10. The valve assembly is utilized in association with a dose filling machine, such as the dose filling machine 200 shown in FIGS. 2 and 3. Such a dose filling machine is configured to apply an accurate, desired dose to fill, for example, a package. Such dose applications can vary from, for example, 15 ml to 300 ml, and more particularly 25 ml and 200 ml, while larger and smaller doses are likewise contemplated. The valve assembly is configured to receive product and then transfer product in doses to the delivery system, and, in turn, to the package.

Referring again to FIG. 1, the valve assembly includes valve body 12, rotor 14, first end seal assembly 16 and second end seal assembly 18. The valve body, in the configuration shown, comprises a six port valve body, that is configured to simultaneously deliver doses to six separate delivery systems to six separate packages. In other configurations, the valve body 12 may be configured to a greater or lesser amount of ports, to, for example, dose dispense to more or less than six separate ports.

With further reference to FIGS. 1 and 4 through 8, the valve body includes top surface 20, bottom surface 22, front surface 24, back surface 26, first side surface 28 and second side surface 29. The valve body comprises a generally rectangular cubic configuration. A plurality of bores are defined in the valve body, including the main supply bore 30, the rotor bore 40, the upper rotor piston bores 46 and the side rotor dispensing bores 50. It will be understood that for each of the upper rotor piston bores 46 and the side rotor dispensing bores 50 each have a such a bore for each corresponding port of the valve.

The main supply bore 30 is defined within the valve body, and includes first side 32, second side 34, defining inner surface 39. A pair of inlet bores 36a, 36b are positioned at opposing sides of the main supply bore, and outlet bores, such as outlet bore 38 extends from the main supply bore (to the rotor bore 40). The two inlet bores can facilitate circulation of product to, for example, keep the flowable material properly mixed or to keep ingredients in, for example, a suspension or the like. Additionally, during cleaning and sanitization, the two inlet ports serve as an inlet and an outlet (and they can be reversed during sanitization to insure that sufficient turbulence occurs to remove the product therewith. There is an outlet bore 38 for each of the ports of the valve body (in the configuration shown, a total of six outlet ports). The main supply bore and the inlet bores are substantially larger in diameter than the outlet bores, in the configuration shown. The main supply bore is substantially parallel to each of the top surface 20, bottom surface 22, front surface 24 and back surface 26, while being perpendicular to and extending between the first side surface 28 and the second side surface 29.

The rotor bore 40 is as extending from first side 42 to second side 44, and including inner surface 45. The rotor bore is, in the configuration shown, parallel to the supply bore while being spaced apart therefrom. The rotor bore is in fluid communication with the main supply bore through the outlet bores 38. In the configuration shown, the rotor bore is of a smaller diameter than the main supply bore. In the configuration shown, the rotor bore is also parallel to each of the top surface 20, bottom surface 22, front surface 24 and back surface 26, while being perpendicular to the first side surface 28 and the second side surface 29. Additionally, the rotor bore extends to the opposing side surfaces 28, 29.

The upper rotor piston bores 46 (one for each port) extend from the rotor bore to the top surface 20 of the valve body 12 and include inlet 47, and outlet 48, while defining inner surface 49. In the configuration shown, the upper rotor piston bores are substantially perpendicular to the rotor bore and parallel to the first side surface and second side surface. The outlet of the bore may be chamfered to facilitate sealed engagement with a piston, in some configurations.

The side rotor dispensing bores 50 (one for each port) are shown as extending from the rotor bore 40 to the front surface 24, and include inlet 52, outlet 54, defining inner surface 55. The side rotor dispensing bores are perpendicular to the front surface 24 and generally parallel to the first side surface and the second side surface of the valve body.

For each of the ports, the outlet bores 38 of the main supply bore 30, the upper rotor piston bores 46, and the side rotor dispensing bores 50 are colinear, and are, in the configuration shown, positioned to extend axially from the rotor bore, being offset from each other by 90°. Additionally, in the configuration shown, the bores of these dimensionally correspond.

Figure 9:
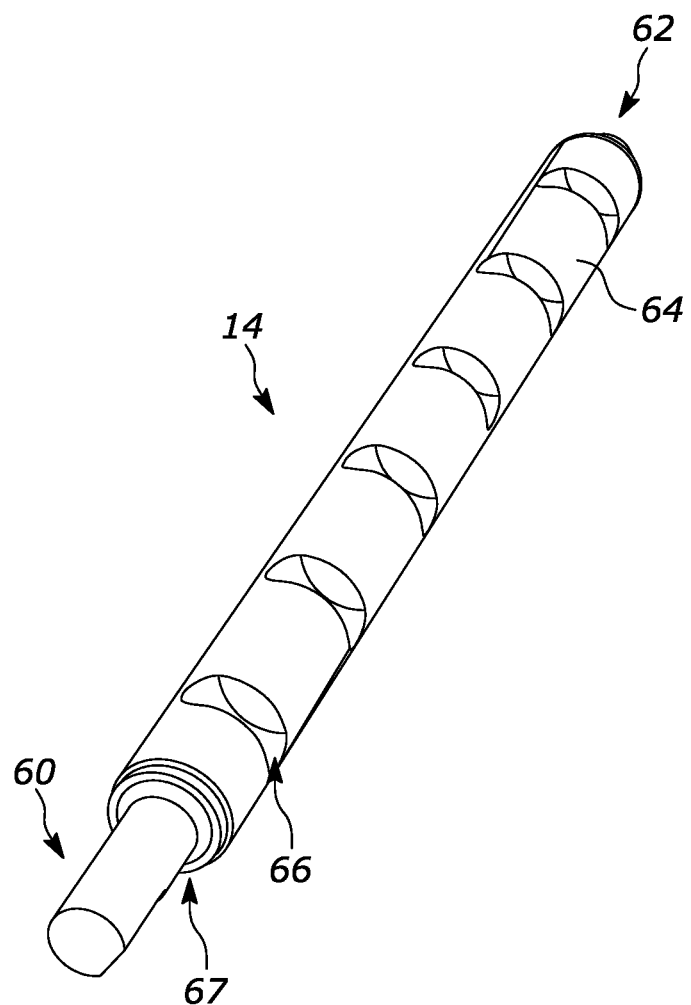
FIG. 9 of the drawings is a perspective view of the rotor of the valve assembly.

The rotor 14 is shown in FIG. 9 as comprising a body having a first end 60 and a second end 62. A step down surface 67 is disposed at the first end (defining a region having a smaller diameter. The body further defines an outer surface 64 which is substantially of a circular cross-sectional configuration defining a cylindrical overall configuration. A plurality of connecting slots, such as connecting slot 66 (one for each port of the valve body) are defined within the rotor. In the configuration shown, the connecting slots have an arcuate reach of 90°. These connecting slots (with respect to each of the ports), when the rotor is in the proper position, can place the inlet bores of the main supply bore in communication with the upper rotor piston bores 46 (a first position), and also can place the upper rotor piston bores in communication with the side rotor dispensing bores (the second position) through rotation of the rotor.

Figure 10:
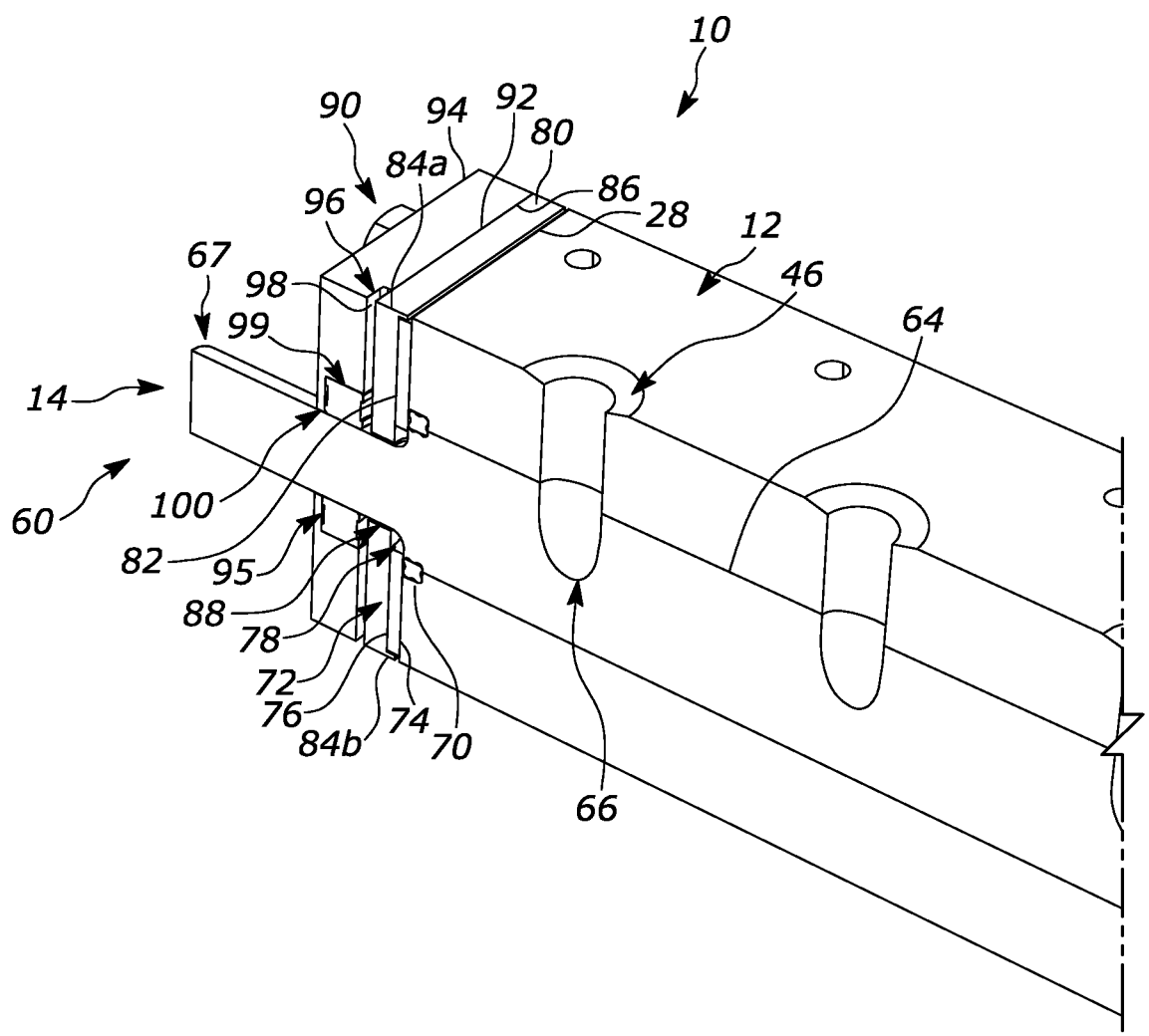
FIG. 10 of the drawings is a cross-sectional perspective view of the valve assembly of the present disclosure, showing, in particular, the first end seal assembly.
Figure 11:
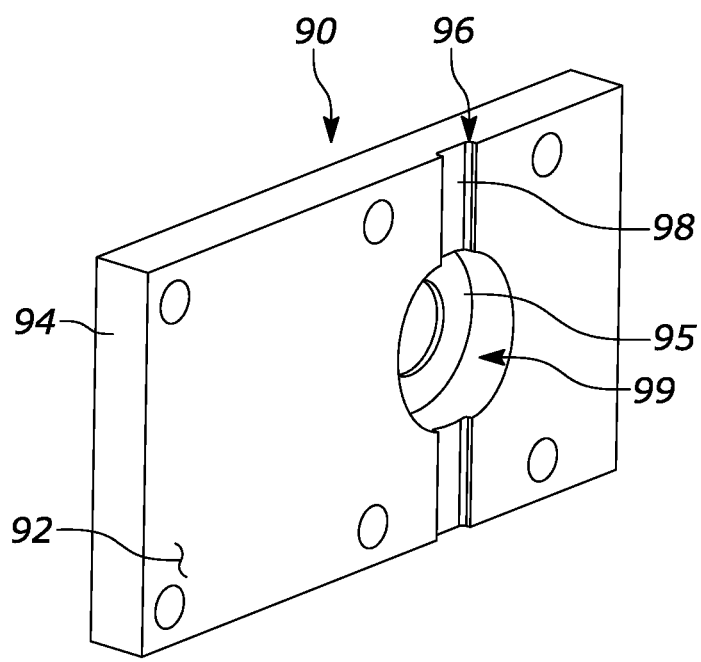
FIG. 11 of the drawings is a perspective view of the first end outer plate of the first end seal assembly of the present disclosure.

With reference to FIGS. 10 and 11, the first end seal assembly 16 provides a seal to the first side surface 28 of the valve body, while allowing the first end of the rotor 14 to extend therethrough (for coupling to a device that can impart rotation thereto). The first end seal assembly 16 includes first end rotor seal 70, first end gasket 72, first end inner plate 80, first end outer plate 90 and first end bearing 100. The first end rotor seal 70 is positioned within a recess in the first side surface 28 of the valve body 12 so as to sealingly engage the first end of the rotor where the first end of the rotor extends through the first side 42 of the rotor bore.

The first end gasket 72 has an inner surface 74, an outer surface 76 and an opening 78, through which the first end of the rotor 14 can extend when assembled. The first end inner plate 80 is positioned on the opposite side of the first end gasket from the valve body so as to sandwich the gasket therebetween. The first end inner plate 80 includes inner surface 82 (with upper and lower rims 84a, 84b that can capture the first end gasket therebetween) and outer surface 86. An opening 88 is provided through the first end inner plate through which the first end of the rotor 14 extends. In the configuration shown, the first end gasket is pressed against the first side surface 28 as well as the first end rotor seal 70. Additionally, the step down surface 67 extends through the first end inner plate 80 as the radius of the rotor is reduced between the first side surface 28 of the valve body and the inner surface of the first end inner plate.

The first end outer plate 90 is shown as comprising inner surface 92, outer surface 94 and opening 99. First end bearing 100 is positioned within the opening 99 with the first end 60 of the rotor 14 extending through the first end bearing 100 (typically a ball or roller bearing, preferably one that is sealed) and the opening 99. The inner surface of the outer plate overlayingly and abuttingly (in the configuration shown) engages the outer surface 86 of the first end inner plate 80. A transverse slot 96 defines a void between the inner surface of the outer plate and the outer surface of the first end inner plate. The transverse slot defines a width 98 and bisects the opening 99 from an upper end of the first outer plate 90 to the lower end of the first outer plate 90. The width of the transverse slot is smaller than the diameter of the step down surface 67 of the first end 60 of the rotor 14 in the configuration shown. The bearing is spaced apart from the inner surface of the first end outer plate so that the bearing, preferably, does not extend into the transverse slot. In the configuration shown, the bearing meets the lower surface of the transverse slot, while being spaced apart from the inner surface of the first end outer plate about the remainder of the opening 99. Additionally, the opening is smaller at the outer surface, such that the bearing has a lower surface 97 upon which the bearing is seated, and which defines a floor for the bearing in the bearing bore portion of the opening.

In some configurations, the transverse slot may extend from the opening 99 to one of the lower edge and the upper edge. In the configuration shown, the transverse slot is substantially vertical and substantially perpendicular to the top surface and the bottom surface of the valve body. In other configurations, the transverse slot may be oblique to the top and bottom surfaces of the valve body (in which case, the transverse slot may be directed to a lower edge or a side edge of the first end outer plate, which is closer to the bottom surface of the valve body than the opening 99, so as to allow gravity to act upon the flowable material to direct the flowable material away from the first end bearing.

Additionally, a single transverse slot is shown, while it is contemplated that multiple transverse slots can be utilized, extending from the opening to an edge. In yet another configuration, the transverse slot may comprise a channel (i.e., a bore that extends from the opening to an edge). For example, in some configurations, the first end inner and outer plates can be formed form a single material, with the transverse slot defining a bore, and with the bearing being insertable from the outer surface of the first end outer plate.

In another configuration, a transverse slot may also be disposed on the outer surface 86 of the first end inner plate 80, either in cooperation with the transverse slot 96, or in place of the transverse slot 96. In such a configuration, the bearing may be positioned closer to the inner surface 92 or flush with the inner surface 92 of the first end outer plate 90.

Advantageously, if the first end rotor seal 70 becomes compromised, and begins to leak fluid that is within the valve body between the rotor 14 and the first side of the rotor bore 40, such fluid will enter the slot 96 and be directed in a downward direction toward the lower end of the first end outer plate and away from contact with the first end bearing. In the environment, some leakage can be expected prior to the need to replace components. However, if such leakage reaches the bearing, premature wear and destruction of the bearing will necessitate a repair (which requires shutdown, cleaning and the like of the equipment) prematurely.

The first end seal assembly can be coupled together by way of bolts that extend through each of the first end gasket, the first inner plate, the first end outer plate and into the first side surface of the valve body.

Figure 12:
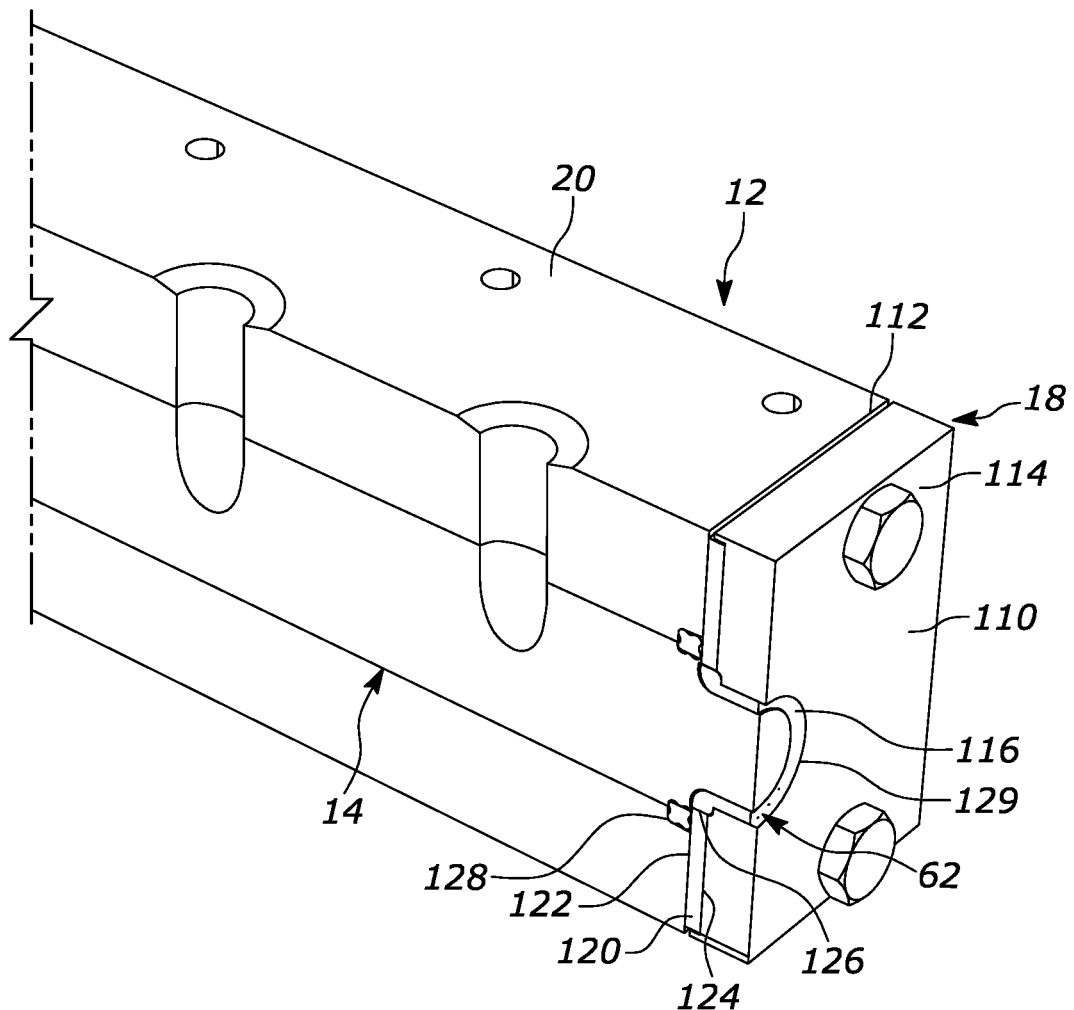
FIG. 12 of the drawings is a cross-sectional perspective view of the valve assembly of the present disclosure, showing, in particular, the second end seal assembly.
Figure 13:
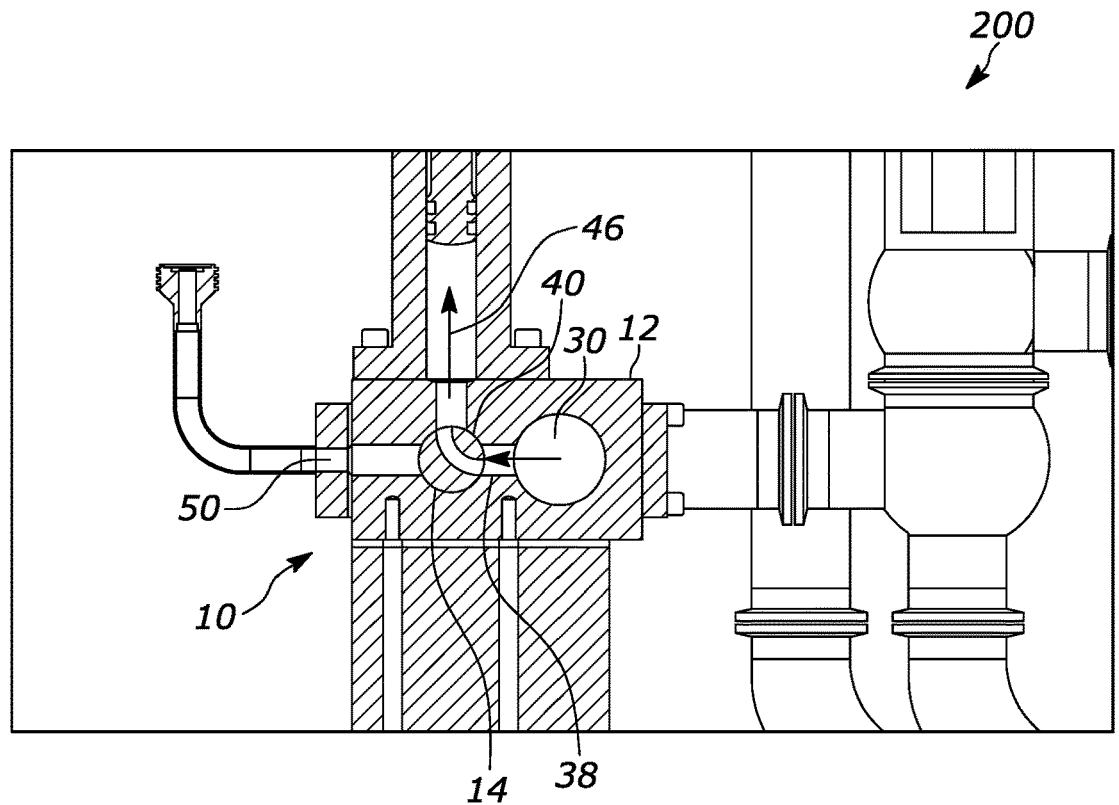
FIG. 13 of the drawings is a cross-sectional schematic view of a portion of the dose filling machine showing the first position of the rotor during a dose filling process.
Figure 14:
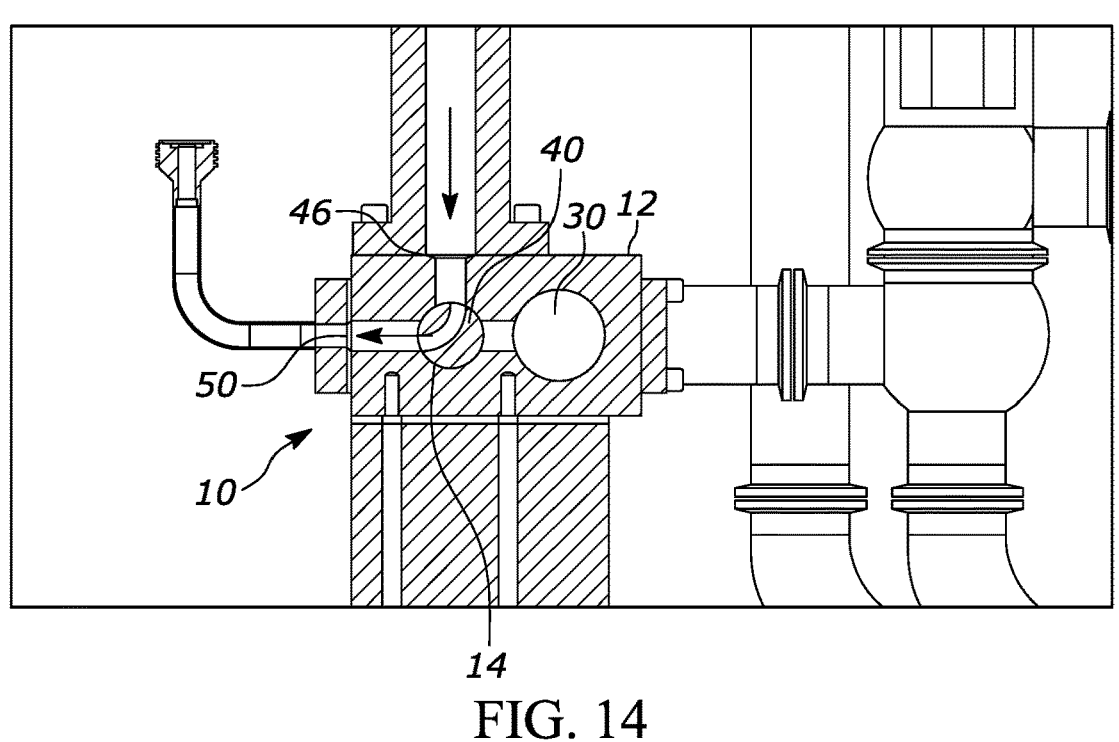
FIG. 14 of the drawings is a cross-sectional schematic view of a portion of the does filling machine showing the second position of the rotor during a dose filling process.
Figure 15:
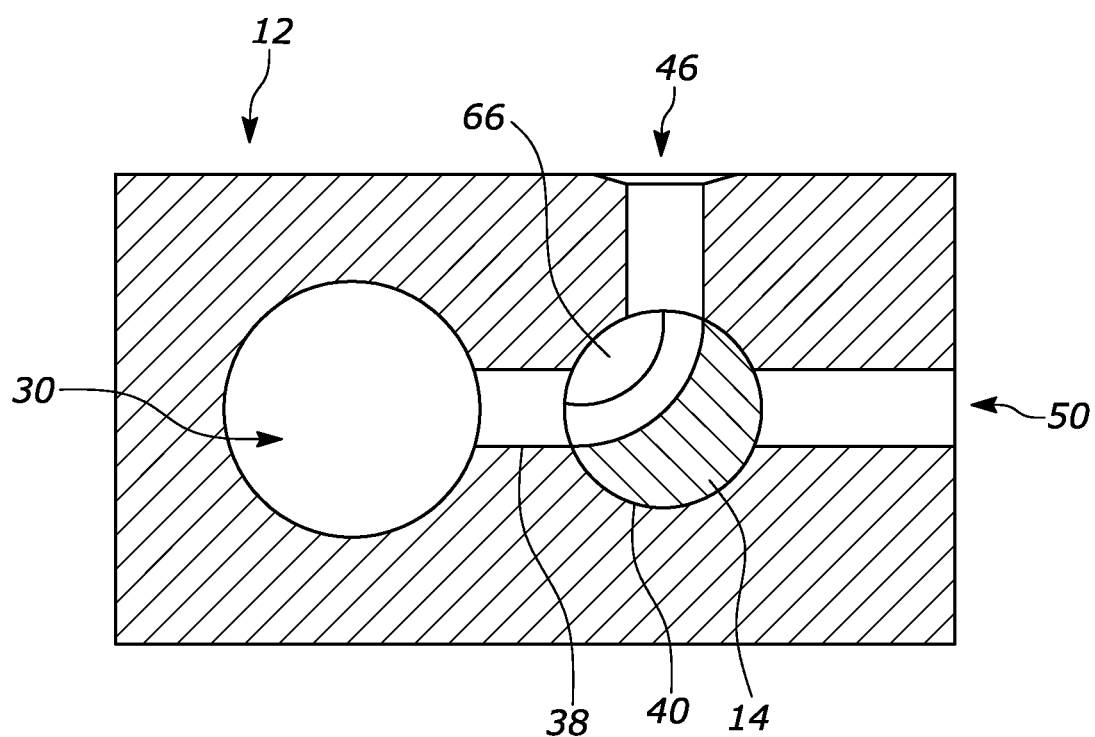
FIG. 15 of the drawings is a cross-sectional view the valve assembly showing the first position of the rotor during a dose filling process.
Figure 16:
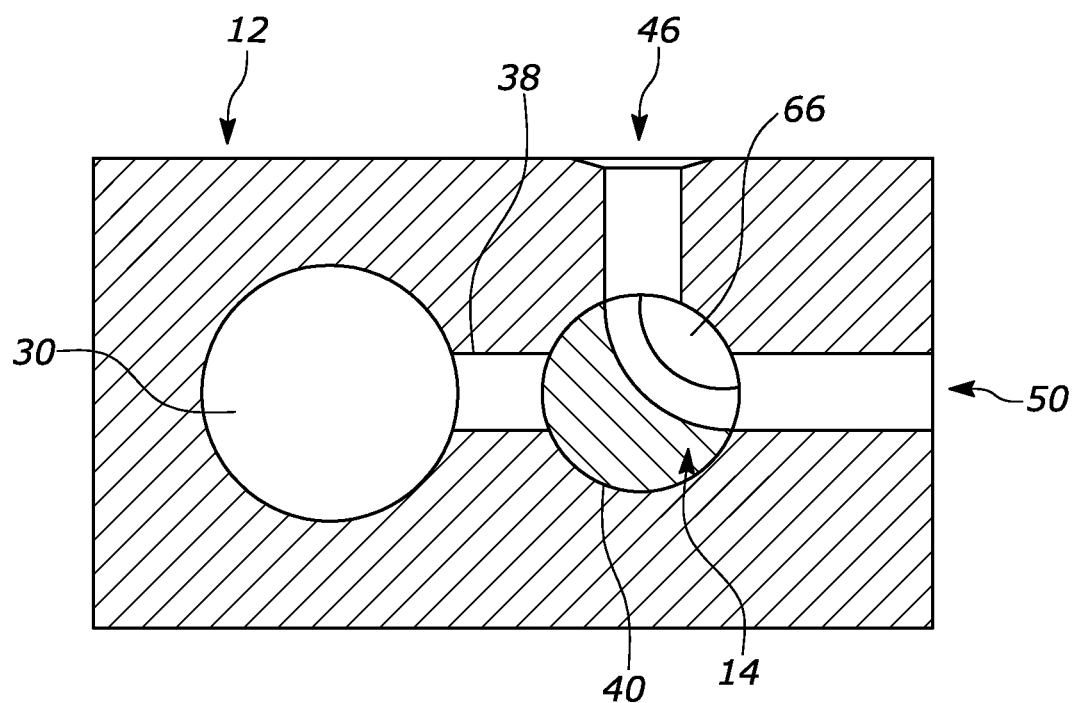
FIG. 16 of the drawings is a cross-sectional view of the valve assembly showing the second position of the rotor during a dose filling process.

The second end seal assembly 18 is shown in FIG. 12 as comprising second end plate 110, second end gasket 120, second end rotor seal 128 and second end bushing 129. The second end plate 110 includes inner surface 112, outer surface 114 and rotor opening 116. The second end plate 110 includes inner surface 112, outer surface 114 and rotor opening 116. The end gasket includes inner surface 122, outer surface 124 and opening 126. A second end rotor seal 128 is installed in a recess in the second side surface 29 of the valve body 12 and sealingly engages the second end of the rotor 14 in sealed engagement.

The second end gasket 120 is sandwiched between the second side 29 of the valve body and the second end plate 110, and the second end gasket likewise engages the second end rotor seal.

Second end bushing 129 is installed in the rotor opening 116 of the second end plate. The rotor 14 further extends through opening 126 of the second end gasket and through the second end bushing 129 and the rotor opening 116. Fasteners extend through the second end plate and second end gasket, and, in turn, into the second side surface of the valve body to sandwich the second end seal assembly together against the second side surface of the valve body.

In operation, and with reference to FIGS. 13 through 16, flowable material (which may comprise any one of a number of different types of products, including but not limited to dressing, sauce, yogurt, cream, other dairy products, condiments, flowable cheeses, syrups, among other foodstuffs, as well as products such as oils, greases, lotions, creams among others), is directed into the main supply bore. Initially, the rotor is rotated about its axis into a position so that the connecting slots place the main supply bore in fluid communication with the upper rotor piston bores (a first position). As the piston is raised, the flowable material is pulled from the main supply bore through the connecting slots and into the upper rotor piston bolts (as well as into the cylinders above the valve body).

Next, the rotor is rotated (in the configuration shown, by 90°) so that the upper rotor piston bore 46 is place into fluid communication with the side rotor dispensing bore 50 (a second position). Once these are in fluid communication, the piston is advanced toward the valve body so as to direct flowable material from the upper rotor piston bore 46 through the connecting slots 66 and into the side rotor dispensing bore 50. The piston movement controls the volume of flowable material that is pulled in from the main supply bore and also that is dispensed through the outlet of the side rotor dispensing bore.

Over time, and with additional reference to FIG. 11, the first end rotor seal 70 may wear so that there is a bit of weeping through the seal. As the equipment operates for hours on end (and any time that the equipment stops, there can be extensive and time consuming procedures that must be executed to get the equipment back on line), stopping and restarting the equipment is a very costly procedure.

If the weeping of flowable material beyond the first end rotor seal contaminates the first end bearing, a premature shutting down and servicing generally occurs. However, with the transverse slot 96 of the first end outer plate, any such weeping is carried away from the first end bearing, and the operation between servicing can be extended.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A valve assembly for a dose filling machine comprising:
   a valve body having a first side surface and a second side surface, the valve body defining:
      a main supply bore having an inlet bore and an outlet bore;
      a rotor bore extending between the first side surface and the second side surface, the rotor bore in fluid communication with the outlet bore of the main supply bore;
      an upper rotor piston bore in fluid communication with the rotor bore, the upper rotor piston bore having an inlet and an outlet;
      a side rotor dispensing bore in fluid communication with the rotor bore, the side rotor dispensing bore having an inlet and an outlet;
   a rotor positioned within the rotor bore and rotatable therewithin relative to the valve body, the rotor having a first end extending beyond the first side surface of the valve body and a second end opposite the first end; and
   a first end seal assembly positionable over the first side surface of the valve body, the first end seal assembly further comprising:
      a first end rotor seal sealingly engaging the valve bore and the rotor proximate the first side surface of the valve body;
      a first end inner plate having an inner surface and an outer surface, the first end inner plate overlying the first side surface of the valve body, the first end inner plate further having an opening through which the first end of the rotor extends;
      a first end outer plate having an inner surface facing the outer surface of the first end inner plate, the first end outer plate having an opening having a first end bearing positioned therein, with the first end of the rotor extending through the opening and the first end bearing, and, the inner surface of the first end outer plate having a transverse slot extending from the opening toward an edge of the first end outer plate closer to the bottom surface of the valve body.

2. The valve assembly of claim 1 wherein the first end bearing is spaced apart from the inner surface of the first end outer plate.

3. The valve assembly of claim 2 wherein the opening in the first end outer plate defines a floor upon which the bearing is seated.

4. The valve assembly of claim 3 wherein the bearing corresponds to a lower surface of the transverse slot.

5. The valve assembly of claim 2 wherein the transverse slot extends from an upper end of the first outer plate to a lower end of the first outer plate.

6. The valve assembly of claim 2 wherein the valve body has a top surface and a bottom surface, and a front surface, to define a rectangular cubic configuration, the transverse slot extending substantially perpendicular to the top surface of the valve body.

7. The valve assembly of claim 1 wherein the transverse slot has a width, with the width being smaller than the opening in the first end outer plate.

8. The valve assembly of claim 1 further comprising a first end gasket positioned between the first end inner plate and the first side surface.

9. The valve assembly of claim 8 wherein a portion of the first end gasket overlies a portion of the first end rotor seal.

10. The valve assembly of claim 9 wherein the inner surface of the first end inner plate includes an inwardly directed rim at an upper end thereof and at a lower end thereof, the inwardly directed rims extending on either side of the first end gasket.

11. The valve assembly of claim 1 wherein the rotor has a step down surface at the first end thereof, wherein the diameter of the step down surface is smaller than a diameter of the rotor, and the step down surface extends beyond the first side surface of the valve body.

12. The valve assembly of claim 1 wherein the bearing comprises one of a ball bearing and a roller bearing.

13. The valve assembly of claim 12 wherein the bearing comprises a sealed ball bearing.

14. The valve assembly of claim 1 further comprising a second end seal assembly, the second end seal assembly comprising a second end plate with a second end rotor seal and a second end bushing, the second end rotor seal sealingly engaging the rotor and the second side surface of the valve body, and the second end plate having the second end bushing positioned in an opening thereof, with the second end of the rotor extending therethrough.

15. The valve assembly of claim 1 wherein the rotor further includes at least one connecting slot, the connecting slot being positionable in a first orientation placing the main supply bore in fluid communication with the upper rotor piston bore, and a second orientation placing the upper rotor piston bore in fluid communication with the side rotor dispensing bore.

16. The valve assembly of claim 15 wherein the first orientation and the second orientation are 90° apart in rotation of the rotor.

17. The valve assembly of claim 1 wherein the outlet bore, the rotor bore, the upper rotor piston bore and the side rotor dispensing bore collectively define a port, with the valve assembly having a plurality of ports, and wherein the rotor includes a connecting slot corresponding to each port.

* * * * *